(12) United States Patent
Endicott et al.

(10) Patent No.: US 11,452,933 B2
(45) Date of Patent: *Sep. 27, 2022

(54) LOTTERY TICKET PACK VERIFICATION SYSTEM AND METHOD

(71) Applicant: IGT GLOBAL SOLUTIONS CORPORATION, Providence, RI (US)

(72) Inventors: Timothy Endicott, Reno, NV (US); Madhu Prakhya, San Ramon, CA (US)

(73) Assignee: IGT Global Solutions Corporation, Providence, RI (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/140,046

(22) Filed: Jan. 2, 2021

(65) Prior Publication Data
US 2021/0121771 A1 Apr. 29, 2021

Related U.S. Application Data

(63) Continuation of application No. 16/393,347, filed on Apr. 24, 2019, now Pat. No. 10,881,949.

(51) Int. Cl.
| | | |
|---|---|---|
| *A63F 3/06* | (2006.01) | |
| *H04N 5/247* | (2006.01) | |
| *G06K 19/06* | (2006.01) | |
| *G06V 30/418* | (2022.01) | |

(52) U.S. Cl.
CPC ........ *A63F 3/064* (2013.01); *G06K 19/06028* (2013.01); *G06V 30/418* (2022.01); *H04N 5/247* (2013.01); *A63F 2250/58* (2013.01); *G06K 2019/06253* (2013.01)

(58) Field of Classification Search
CPC .... H04N 5/23229; H04N 5/247; A63F 3/064; A63F 2250/58; G06K 19/06028; G06K 2019/06253; G06V 30/418
See application file for complete search history.

(56) References Cited

U.S. PATENT DOCUMENTS

| | | | |
|---|---|---|---|
| 6,875,105 B1 | 4/2005 | Behm et al. | |
| 8,638,479 B2* | 1/2014 | Irwin, Jr. | ................ B60R 1/084 |
| | | | 356/435 |
| 10,148,918 B1* | 12/2018 | Seiger | ..................... G06Q 50/28 |
| 10,600,283 B2* | 3/2020 | Froelich | ................ G07F 17/329 |
| 2005/0098632 A1 | 5/2005 | Heske et al. | |
| 2008/0128492 A1 | 6/2008 | Roth et al. | |
| 2009/0059316 A1* | 3/2009 | Irwin, Jr. | ................ H04N 1/195 |
| | | | 358/474 |
| 2009/0084845 A1* | 4/2009 | Post | ........................ B07C 3/087 |
| | | | 221/7 |
| 2017/0209780 A1 | 7/2017 | Irwin et al. | |
| 2017/0236371 A1* | 8/2017 | Froelich | .............. G07F 17/3241 |
| | | | 463/17 |
| 2018/0005482 A1 | 1/2018 | Ghia et al. | |
| 2018/0020126 A1* | 1/2018 | Weil | ...................... A63F 3/0655 |
| 2018/0186558 A1 | 7/2018 | Mejenborg et al. | |

* cited by examiner

*Primary Examiner* — Boubacar Abdou Tchoussou
(74) *Attorney, Agent, or Firm* — Neal, Gerber & Eisenberg LLP

(57) ABSTRACT

A lottery ticket pack verification system and method for simultaneously scanning a plurality of picked lottery ticket packs and for determining if the scanned lottery ticket packs are the correct lottery ticket packs based on a lottery ticket pack pick list.

20 Claims, 12 Drawing Sheets

LOTTERY TICKET PACK VERIFICATION SYSTEM AND METHOD

PRIORITY

This patent application is a continuation of, claims priority to and the benefit of U.S. patent application Ser. No. 16/393,347, filed on Apr. 24, 2019, the entire contents of which are incorporated by reference herein.

BACKGROUND

The present disclosure relates to lottery ticket pack verification systems and methods, and more particularly to lottery ticket pack verification systems and methods that enable quick and accurate verification of picked wrapped, such as by plastic, lottery ticket packs prior to shipment.

BRIEF SUMMARY

In various embodiments, the present disclosure relates to a lottery ticket pack verification system including a lottery ticket pack supporter, a first digital camera, a second digital camera, a display device and a controller configured to operate with the first digital camera, the second digital camera and the display device. The controller of the lottery ticket pack verification system is configured to cause a scan by the first and second digital cameras of a plurality of wrapped lottery ticket packs arranged face down on the lottery ticket pack supporter, and cause a display, by the display device, of an image based on the scan of the plurality of wrapped lottery ticket packs, The controller of the lottery ticket pack verification system is also configured and determine if the plurality of wrapped lottery ticket packs arranged on the lottery ticket pack supporter match a lottery ticket pack list.

In other various embodiments, the present disclosure relates to a lottery ticket pack verification system including a frame, a lottery ticket pack supporter supported by the frame, a camera support supported by the frame, a first digital camera supported by the camera support, a second digital camera supported by the camera support, a combination display and input device, and a controller configured to operate with the first digital camera, the second digital camera, and the combination display and input device. The controller of the lottery ticket pack verification system is configured to cause a scan by the first and second digital cameras of a plurality of wrapped lottery ticket packs arranged face down on the lottery ticket pack supporter to capture an image comprising a plurality of lottery ticket information indicia visible on the back surfaces of the bottom most tickets of the wrapped lottery ticket packs arranged on the lottery ticket pack supporter, analyze the captured image to determine if the plurality of wrapped lottery ticket packs arranged on the lottery ticket pack supporter match the lottery ticket pack list, responsive to determining that any one of the wrapped lottery ticket packs arranged on the lottery ticket pack supporter does not match the lottery ticket pack list, cause a display, via the combination display and input device, an error notification, and responsive to determining that all of the plurality of wrapped lottery ticket packs arranged on the lottery ticket pack supporter match the lottery ticket pack list, cause a display, via the combination display and input device, a pass notification.

In various other embodiments, the present disclosure provides a method of operating a lottery ticket pack verification system. The method includes collecting a plurality of identified wrapped lottery ticket packs based on a lottery ticket pack list associated with a lottery ticket order and arranging the collected plurality of wrapped lottery ticket packs face down on a lottery ticket pack supporter. The method further includes scanning, by a first digital camera and a second digital camera, the arranged plurality of face down wrapped lottery ticket packs on the lottery ticket pack supporter, displaying, by a display device, an image based on the scan of the plurality of face down wrapped lottery ticket packs, and determining, by a controller, if the scanned plurality of wrapped lottery ticket packs match the lottery ticket pack list. The method further includes, responsive to a determination that any one of the plurality of wrapped lottery ticket packs arranged on the lottery ticket pack supporter does not match the lottery ticket list, designating that determined wrapped lottery ticket pack as an incorrect wrapped lottery ticket pack, and replacing the incorrect wrapped lottery ticket pack with a correct wrapped lottery ticket pack based on the lottery ticket pack list. The method further includes, responsive to a determination that all of the plurality of wrapped lottery ticket packs arranged on the lottery ticket pack supporter match the lottery ticket list, designating the plurality of wrapped lottery ticket packs as verified wrapped lottery ticket packs, and completing the lottery ticket order with the verified wrapped lottery ticket packs.

Additional features are described in, and will be apparent from, the following Detailed Description and the figures.

DETAILED DESCRIPTION

In various embodiments, the present disclosure relates generally to a lottery ticket pack verification system and a method of operating the lottery ticket pack verification system. For a better understanding of the present disclosure, example known lottery tickets, example known lottery ticket packs, example known lottery ticket pack pick lists, and an example known lottery ticket pack picking procedure are first described.

Figure 1A:
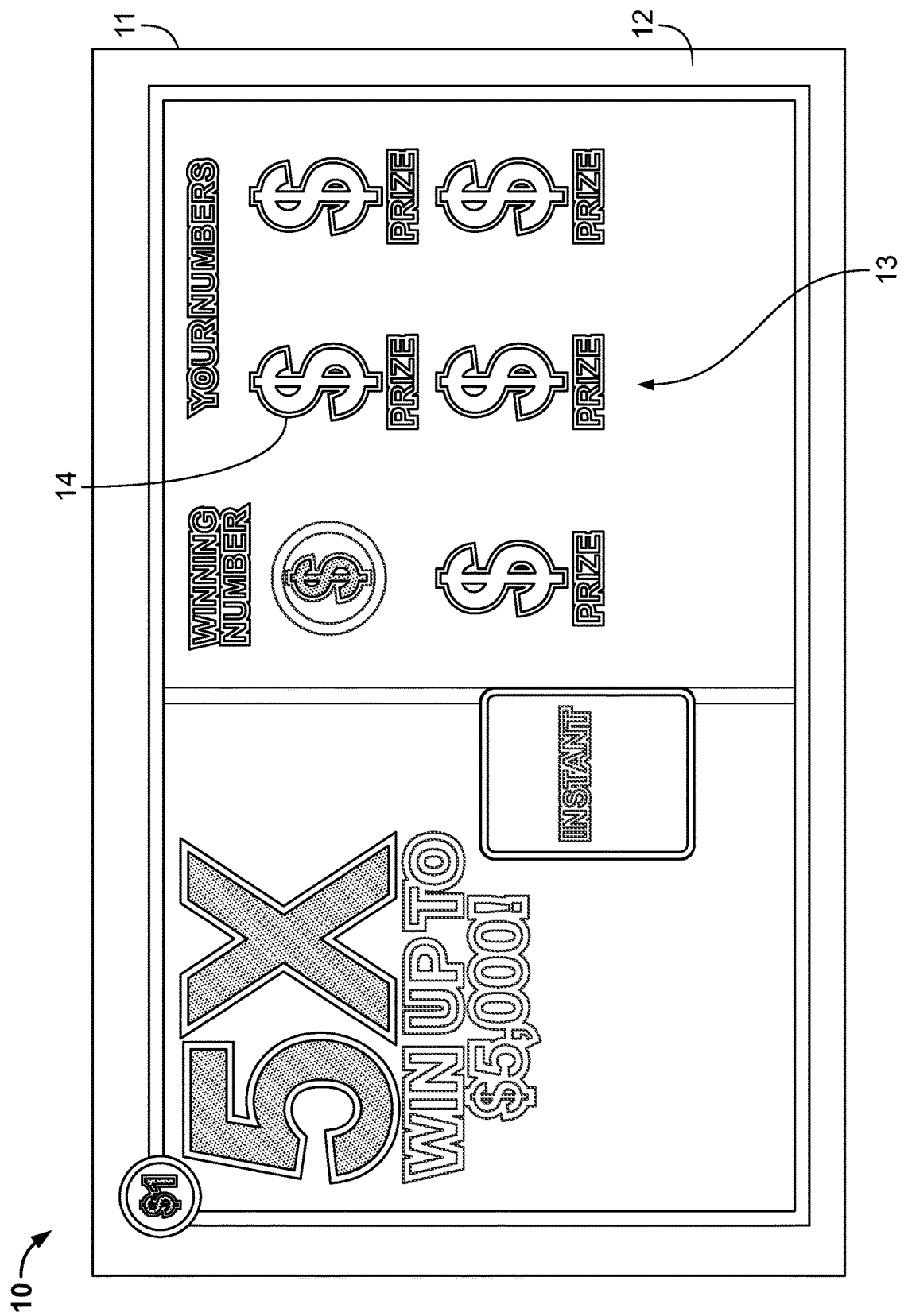
FIG. 1A is a front view of an example single game lottery ticket.
Figure 1B:
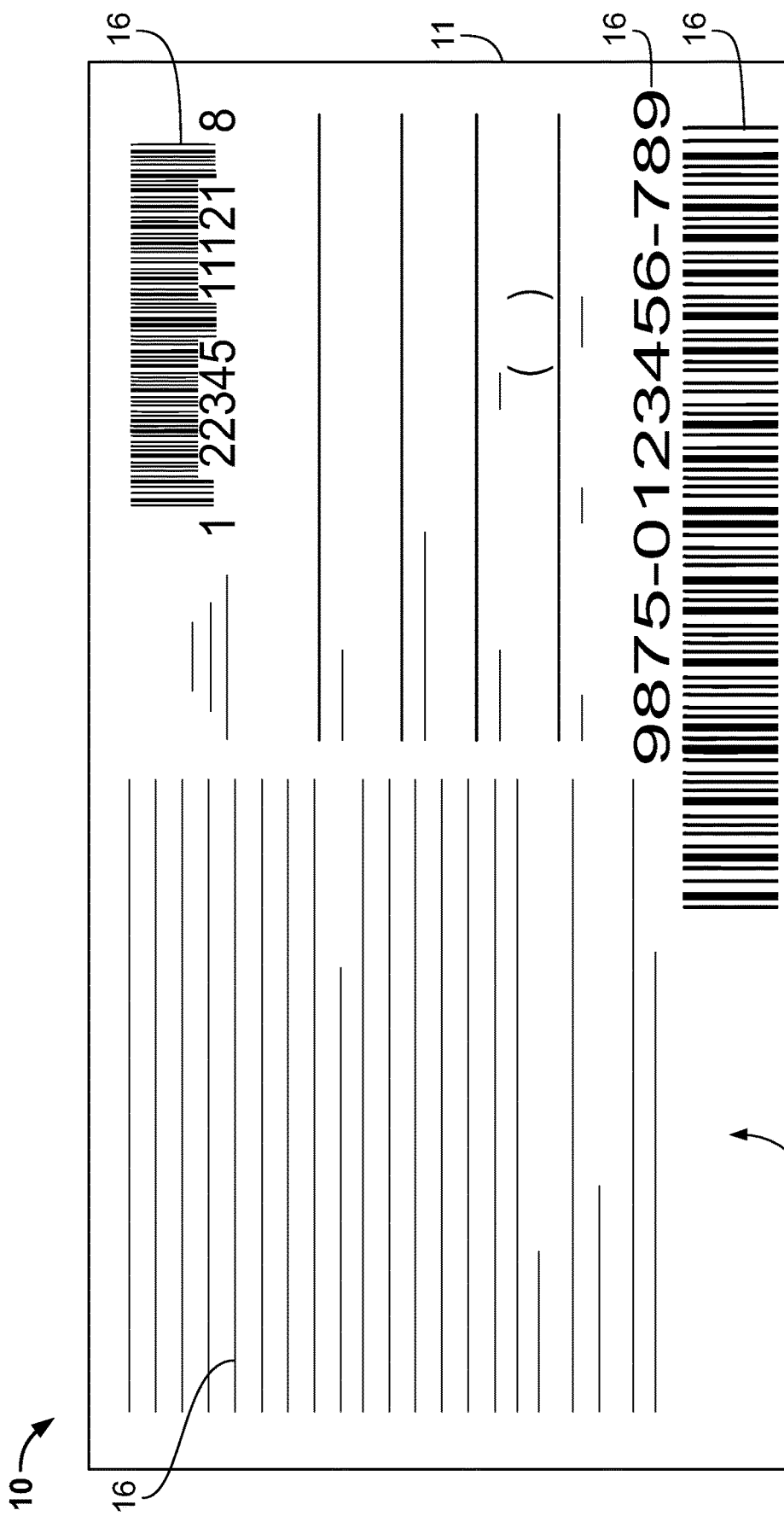
FIG. 1B is a rear view of the example single game lottery ticket of FIG. 1A.

Various known lottery tickets are single game lottery tickets. One example single game lottery ticket is illustrated in FIGS. 1A and 1B. This example single game lottery ticket 10 includes: (1) a ticket substrate 11; (2) a front surface 12 of the ticket substrate 11; (3) a predefined scratch-off area 13 defined on the front surface 12; (4) a scratch-off coating ("SOC") 14 covering variable lottery game indicia (not shown) printed on the predefined scratch-off area 13; (6) a back surface 15 of the ticket substrate 11; and (7) variable lottery ticket information indicia 16 printed on the back surface 15. The lottery ticket information indicia 16 can include text, one or more ticket numbers, one or more ticket barcodes, and other lottery ticket information that is either or both human readable and machine readable. Certain of this information identifies the lottery ticket, the set, run, or group of lottery tickets which this lottery ticket is part of, and may provide other inventory control information. Various known single game lottery tickets can include multiple predefined scratch-off areas, multiple sets of variable lottery game indicia printed on the predefined scratch-off areas, and multiple scratch-off coatings ("SOCs") covering the variable lottery game indicia sets.

Figure 2A:
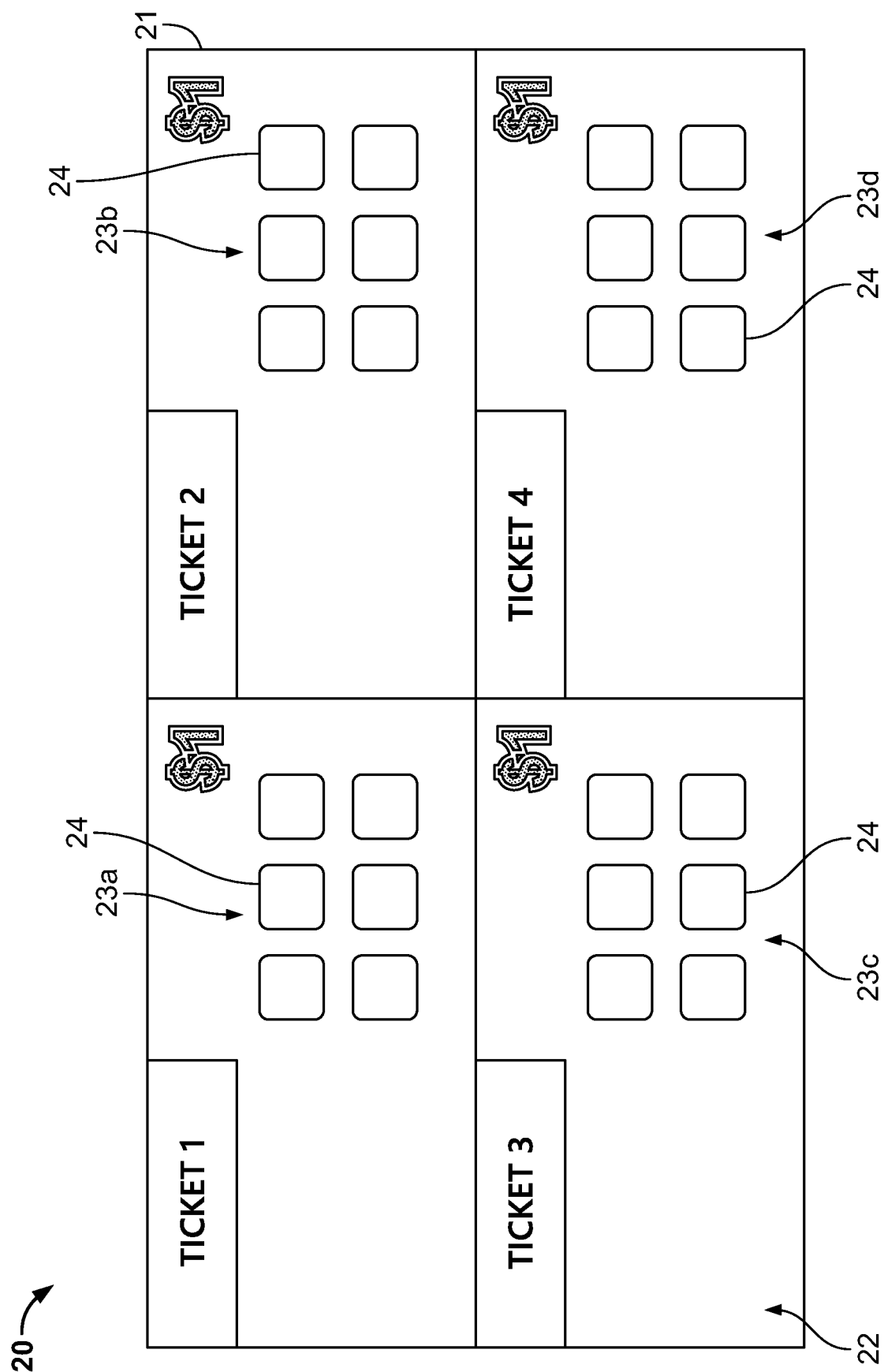
FIG. 2A is a front view of an example multi-game lottery ticket.
Figure 2B:
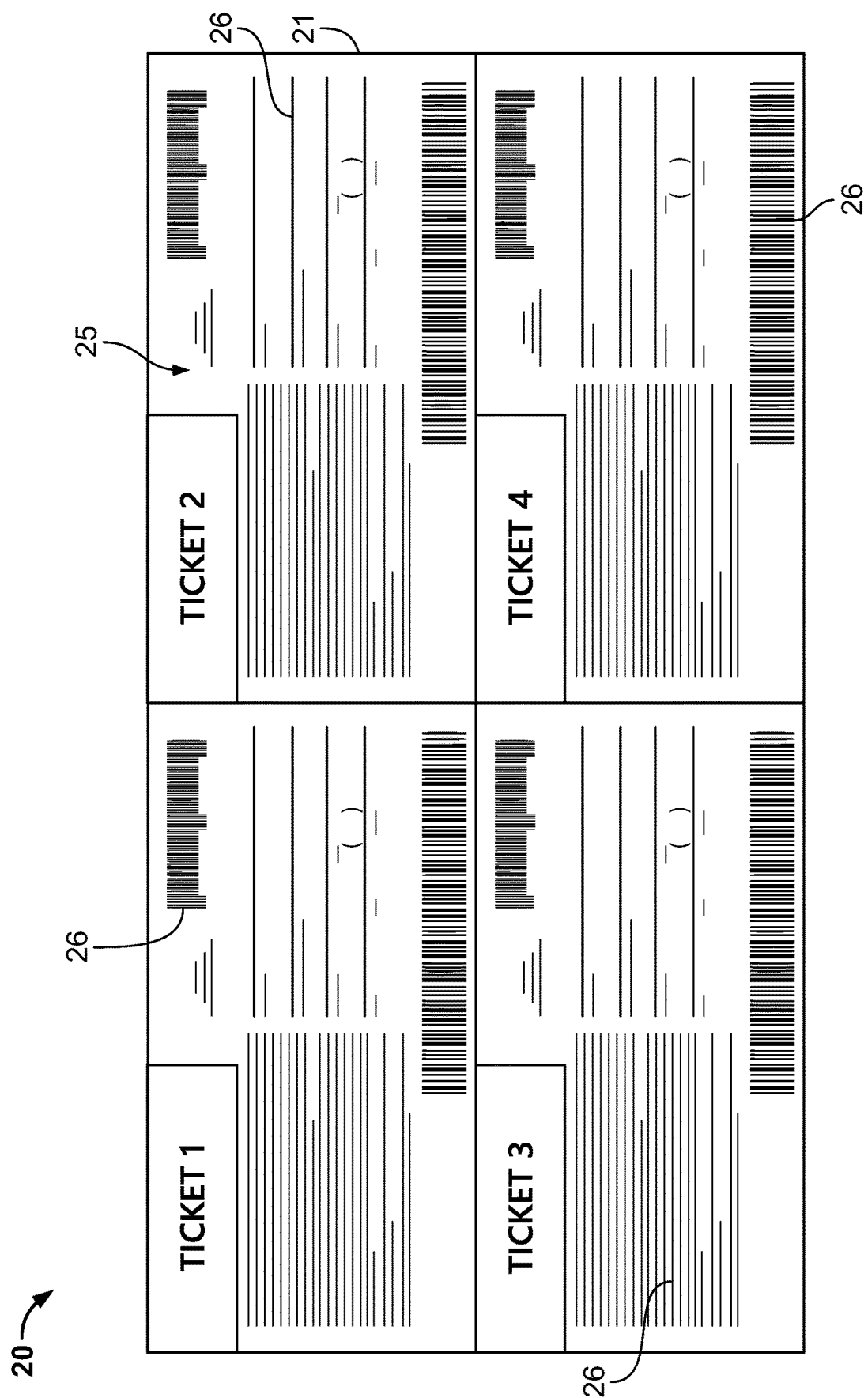
FIG. 2B is a rear view of the example multi-game lottery ticket of FIG. 2A.
Figure 3:
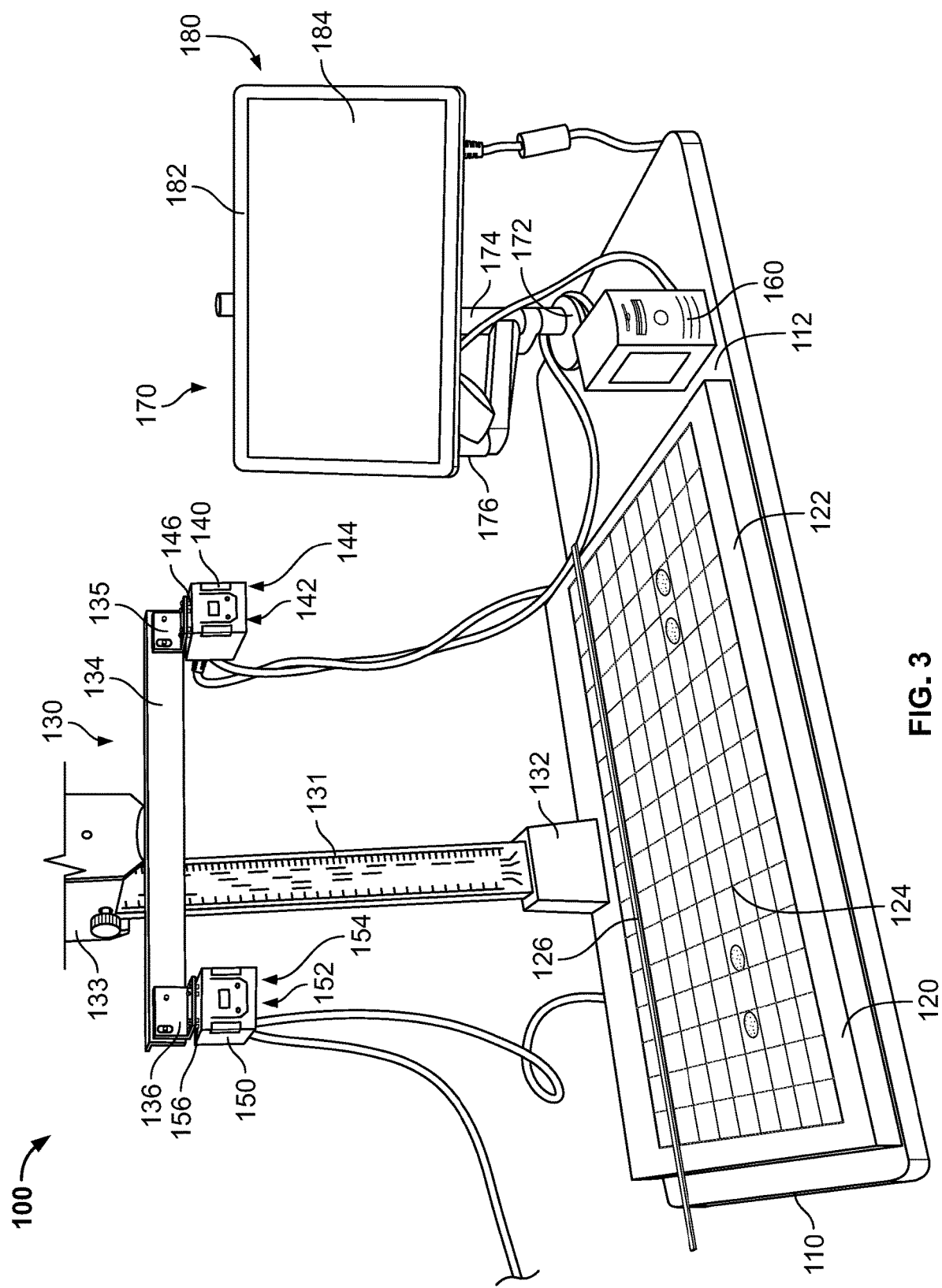
FIG. 3 is a front perspective view of one example embodiment of a lottery ticket pack verification system of the present disclosure.

Various known known lottery tickets are multi-game lottery tickets. One example multi-game lottery ticket is illustrated in FIGS. 2A and 2B. This example multigame lottery ticket 20 includes four separate games. This example multigame lottery ticket 20 includes: (1) a ticket substrate 21; (2) a front surface 22 of the ticket substrate 21; (3) four predefined scratch-off areas 23a, 23b, 23c, and 23d defined on the front surface 22 (and including one area for each game); (4) four scratch-off coatings 24 covering respective lottery game indicia (not shown) printed in each of the predefined scratch-off areas 23a, 23b, 23c, and 23d; (5) a back surface 25 of the ticket substrate 21; and (6) four sets of variable lottery ticket information indicia 26 printed on the back surface 25. The lottery ticket information indicia 26 can include text, ticket numbers, ticket barcodes, and other lottery ticket information that is either or both human readable and machine readable. Certain of this information identifies the lottery ticket, the set, run, or group of lottery tickets which this lottery ticket is part of, and may provide other inventory control information. These known multi-game game lottery tickets thus include multiple predefined scratch-off areas, multiple sets of variable lottery game indicia printed on the predefined scratch-off areas, and multiple scratch-off coatings ("SOCs") covering the variable lottery game indicia sets.

Single game lottery tickets (such as ticket 10) are typically of a smaller size than multi-game lottery tickets (such as ticket 20) that are typically of a larger size compared to the single game tickets.

Various such lottery tickets are often arranged after manufacture (which includes after complete printing) in lottery ticket packs for storage, for organization, for sorting, for picking, and for shipping to lottery ticket distributors or lottery ticket retailers. The lottery ticket packs typically include: (1) a stack of lottery tickets (that are all of the same type, same size, and same game(s)); and (2) a transparent pack wrapping, such as transparent plastic wrapping, securely wrapped around the stack of lottery tickets. Such lottery ticket packs are configured such that the back surface of the bottom most lottery ticket is generally visible through the transparent pack wrapping when the lottery ticket stack or pack is placed face down. Different lottery ticket packs often have size tickets and different quantities of tickets in the stack and thus have different pack dimensions (e.g., length, width, and/or height). In other words lottery ticket packs may have a different shape, size, and/or height compared to other lottery ticket packs.

Lottery ticket pack lists are typically generated based on an order for lottery tickets (such as from a lottery ticket retailer). Various known lottery ticket pack pick lists include: (1) a paper or electronic ticket list of each lottery ticket pack associated with a specific lottery ticket order; and (2) a separate pack identifier associated with each lottery ticket pack listed on the pack list. The pack identifier is associated with various lottery ticket information indicia (e.g., text, ticket numbers, and ticket barcodes) printed on the back surface of each ticket in a lottery ticket pack and visible on the bottom most ticket in that lottery ticket pack. A lottery ticket pack list is typically used for a lottery ticket pack picking procedure for filling the lottery ticket pack order of that list.

One known lottery ticket pack picking procedure includes a lottery ticket picker accessing a lottery ticket pack list associated with a specific lottery ticket order. The lottery ticket picker collects all of the lottery ticket packs listed on the lottery ticket list from a lottery ticket pack inventory area. The lottery ticket picker uses a bar code scanner to scan one of the collected lottery ticket packs and to confirm and validate that scanned lottery ticket pack matches one of the lottery ticket packs listed on the lottery ticket pack list. If the scanned lottery ticket pack matches one of the lottery ticket packs listed on the lottery ticket pack list previously not picked, the lottery ticket picker places that lottery ticket pack in an order assembly area. The lottery ticket picker then moves on to scan another collected lottery ticket pack on the lottery ticket pack list, and the confirming and verification process is repeated. If any one of the scanned lottery ticket packs does not match one of the lottery ticket packs listed on the lottery ticket pack list, then the lottery ticket picker returns the incorrect lottery ticket pack to the lottery ticket pack inventory area. The lottery ticket picker then collects another lottery ticket pack listed on the lottery ticket pack list from the lottery ticket pack inventory area and scans that collected lottery ticket pack. If that scanned lottery ticket pack matches a lottery ticket pack on the lottery ticket pack list then the lottery ticket picker places that lottery ticket pack in an order assembly area. Once the lottery ticket picker confirms and verifies all of the lottery ticket packs on the lottery ticket pack list the lottery ticket picker completes the specific lottery ticket order in the order assembly area.

Certain problems exist with this known lottery ticket pack picking procedure. For example, individually collecting, scanning, and confirming each designated lottery ticket pack adds significant time to completing lottery ticket pack orders, increases susceptibility to scanning errors during the picking and verification procedure, and reduces overall productivity of the lottery ticket pickers performing the lottery ticket pack picking procedure. The apparatus and method of the present disclosure overcome these problems.

Referring now to FIGS. 3, 4, 5, 6, 7, and 8, one example embodiment of a lottery ticket pack verification system 100 of the present disclosure is illustrated. The lottery ticket pack verification system 100 includes: (1) a frame 110; (2) a lottery ticket pack supporter 120 supported by the frame 110; (3) a camera support 130 mounted on and supported by the frame 110 or the lottery ticket pack supporter 120; (4) a first digital camera 140 mounted on and supported by the camera support 130; (5) a second digital camera 150 mounted on and supported by the camera support 130; (6) a controller 160 supported by the frame 110; (7) a display mounting support 170 connected to and supported by the frame 110; and (8) a combination display and input device 180 mounted to and supported by the display mounting support 170.

More specifically, the frame 110 in this illustrated example embodiment includes: (1) a flat horizontally extending base 112; and (2) a plurality of frame supports (not shown) that are connected to and support the flat base 112. It should be appreciated that the frame 110 thus provides a suitable supporting structure (e.g., a table) for the example lottery ticket pack verification system 100. It should also be appreciated that the frame 110 may be alternately constructed, configured, and/or sized in accordance with the present disclosure.

The illustrated lottery ticket pack supporter 120 includes: (1) a flat horizontally extending member 122 supported by the flat base 112 of the frame 110; (2) an alignment pattern 124 on the horizontally extending member 122; and (3) a tray aligner 126 aligned with the alignment pattern 122 and connected to the horizontally extending member 122. In some examples, The lottery ticket pack supporter 120 is configured to receive and support a lottery ticket pack scanning tray 200. It should be appreciated that the lottery ticket pack supporter 120 may be alternately constructed, configured, and/or sized in accordance with the present disclosure.

Figure 4:
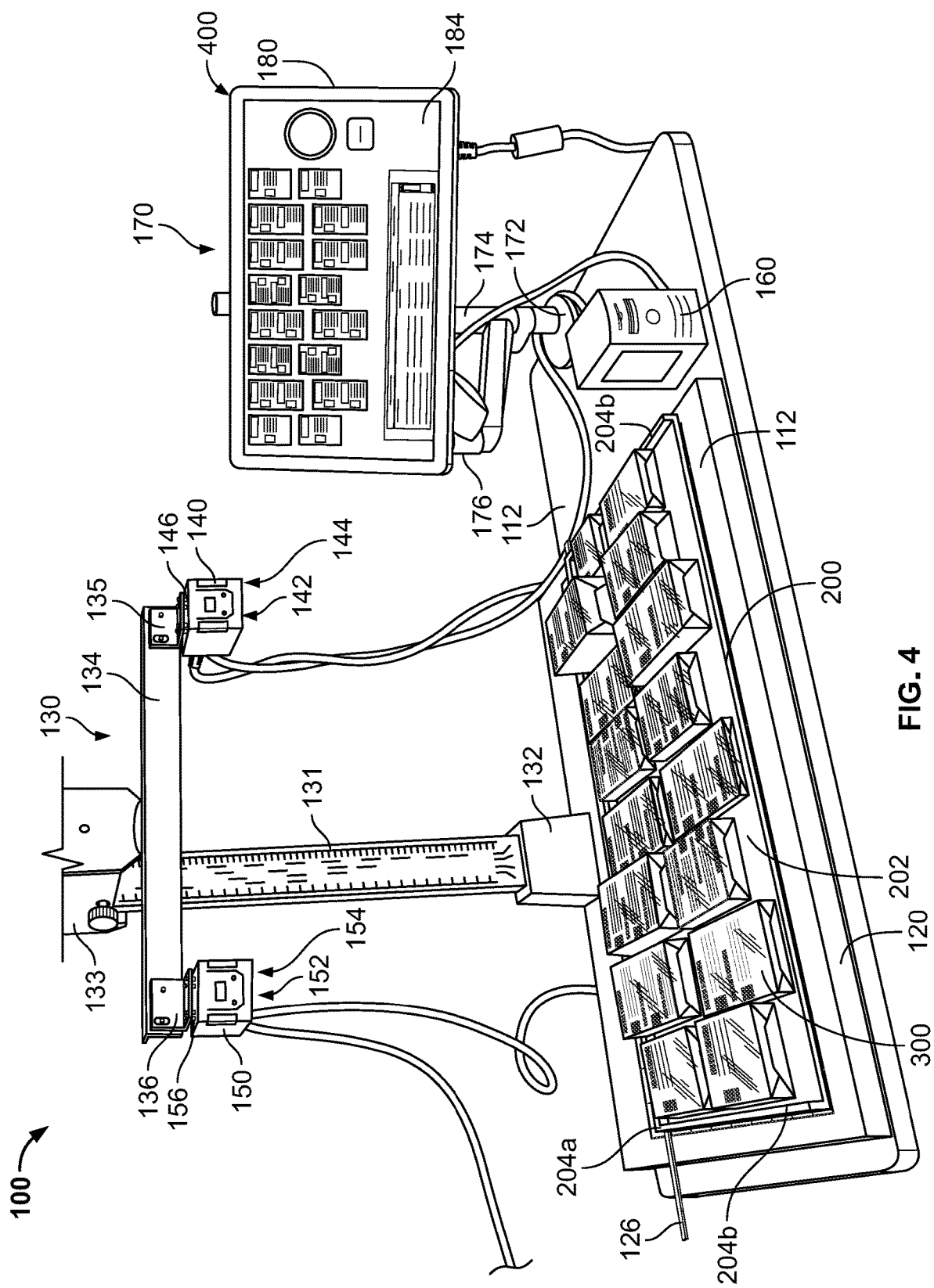
FIG. 4 is a front perspective view of the lottery ticket pack verification system of FIG. 3, and showing a plurality of different picked lottery ticket packs positioned face down on a lottery ticket pack scanning tray that is positioned on the lottery ticket pack tray support of the lottery ticket pack verification system for scanning.
Figure 5:
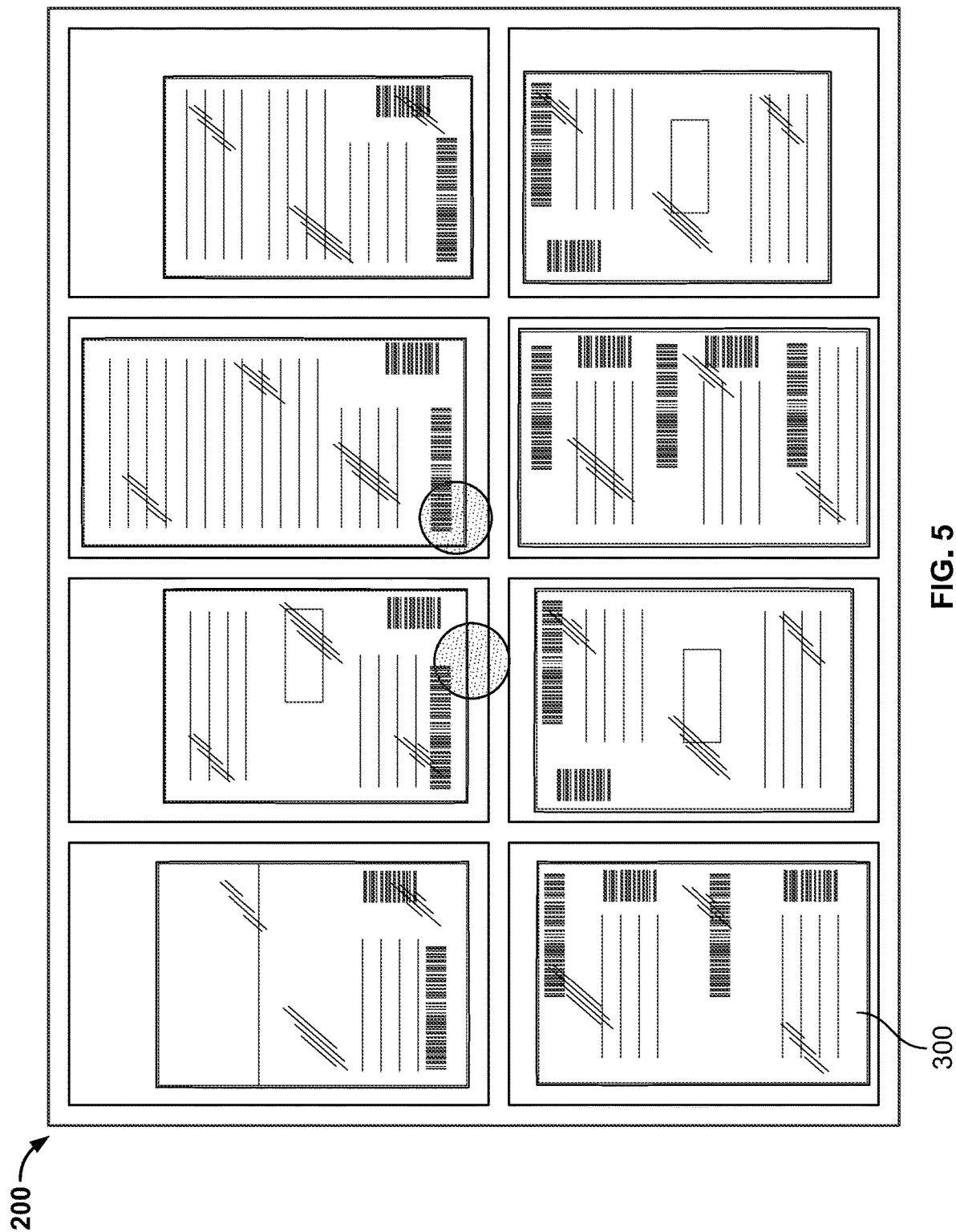
FIG. 5 is a top view of the plurality of different picked lottery ticket packs arranged on the lottery ticket pack scanning tray that is positioned on the lottery ticket pack tray support of the lottery ticket pack verification system for scanning.

One example lottery ticket pack scanning tray 200 with a plurality of picked face down ticket packs 300 is illustrated in FIG. 4. The illustrated example lottery ticket pack scanning tray 200 includes: (1) a tray member 202 for supporting a plurality of lottery ticket packs 300; and (2) a plurality of upright tray walls 204 extending vertically upwardly from the tray member 202. In the illustrated example, the plurality of tray walls 204 include a side wall 204a and a plurality of end walls 204b. The side wall 204a and end walls 204b are configured to help maintain position of the plurality of lottery ticket packs 300 on the tray member 202. It should be appreciated that the lottery ticket pack scanning tray 200 may be alternately constructed, configured, and/or sized in accordance with the present disclosure.

The lottery ticket pack scanning tray 200 is removable from the lottery ticket pack supporter 120 in this illustrated example embodiment. The lottery ticket pack scanning tray 200 is configured to align with the alignment pattern 122. The tray aligner 126 is configured to be engaged by the lottery ticket pack scanning tray 200 such that the lottery ticket pack scanning tray 200 is in alignment with the alignment pattern 122 of the lottery ticket pack supporter 120 to correctly position the lottery ticket packs on the tray 200 for scanning.

The lottery ticket pack scanning tray 200 is configured to support a plurality of lottery ticket packs 300 for simultaneous verification by the lottery ticket pack verification system 100. As best illustrated in FIG. 4, the plurality of lottery ticket packs 300 are placed face down on the lottery ticket pack scanning tray 200 and arranged in rows and/or columns on the tray member 202. In this illustrated example, the plurality of lottery ticket packs 300 include packs of lottery tickets with different lengths, widths, and/or heights. For example, the lottery ticket pack scanning tray 200 may include different lottery ticket packs 300 with different sized tickets and different quantities of tickets in two or more of the stacks. Thus, the different lottery ticket packs 300 have different pack dimensions (e.g., one lottery ticket pack may have a different shape, size, and/or height compared to another lottery ticket pack).

In some examples, the lottery ticket pack scanning tray 200 may not be used. As such, the plurality of lottery ticket packs 300 are arranged directly on the surface of the lottery ticket pack supporter 120 or the base 112 of the frame 110 for simultaneous verification by the lottery ticket pack verification system 100.

The illustrated camera support 130 includes: (1) a vertical support frame 131; (2) a support base 132 suitably connected to the vertical support frame 131 and the lottery ticket pack supporter 120; (3) a top support member 133 suitably connected to and mounted on a top portion of the vertical support frame 131; (4) a transverse support frame 134 suitably connected to the top support member 133; (5) a first mounting bracket 135 suitably connected to the transverse support frame 134; and (6) a second mounting bracket 136 suitably connected to the transverse support frame 134. It should be appreciated that the camera support may be alternately constructed, configured, and/or sized in accordance with the present disclosure.

In the illustrated example, the first digital camera 140 is controlled by and connected to the controller 160. The first digital camera 140 includes, among other components: (1) an illumination source 142 configured to illuminate the lottery ticket packs 300 positioned on the lottery ticket pack scanning tray 200 for verification; (2) a lens 144 configured to focus on and capture images of the illuminated lottery ticket packs 300 arranged on the lottery ticket pack scanning tray 200; and (3) a camera mount 146 suitably connected to the first mounting bracket 135.

Likewise, in the illustrated example, the second digital camera 150 is controlled by and connected to the controller 160. The second digital camera 150 is spaced apart from the first digital camera 140. The second digital camera 150 includes, among other components: (1) an illumination source 152 configured to illuminate the lottery ticket packs 300 positioned on the lottery ticket pack scanning tray 200 for verification; (2) a lens 154 configured to focus on and capture images of the illuminated lottery ticket packs 300 arranged on the lottery ticket pack scanning tray 200; and (3) a camera mount 156 suitably connected to the second mounting bracket 136.

The first and second cameras 150 and 160 are each configured with a wide field of view (FOV) lens (e.g., lens 144 and lens 154) such that lottery ticket packs 300 having different shapes, sizes and/or heights can be simultaneously imaged for verification by the lottery ticket pack verification system 100. The wide FOV lens enables the lottery ticket pack verification system 100 to simultaneously scan multiple different lottery ticket packs 300 with different sized tickets and different quantities of tickets in the stacks. In other words, the wide FOV lens enables the lottery ticket pack verification system 100 to simultaneously scan lottery ticket packs 300 having different pack dimensions (e.g., length, width, and height). It should be appreciated that the cameras, the quantity of cameras, and the positions of the cameras may vary in accordance with the present disclosure.

In the illustrated example the controller 160 includes one or more processors (or processing devices) and one or more memory devices. The one or more processors (or processing devices) are configured to execute program code and instructions stored on the one or more memory devices to control the lottery ticket pack verification system 100.

The one or more suitable processors (or processing devices) of the controller 160 may include but are not limited to: (1) a processor; (2) a microprocessor; (3) a microcontroller-based platform; (4) a suitable integrated circuit; and (5) an application-specific integrated circuit (ASICs).

The one or more memory devices may include but are not limited to: (1) volatile memory (e.g., RAM that can include non-volatile RAM, magnetic RAM, ferroelectric RAM; and any other suitable forms); (2) non-volatile memory (e.g., disk memory, FLASH memory, EPROMs, EEPROMs, non-volatile solid-state memory, and any other forms); (3) unalterable memory (e.g., EPROMs and any other forms); (4) read-only memory; (5) a secondary memory storage device (e.g., a non-volatile memory device); and (6) any other suitable magnetic, optical and/or semiconductor memory. The one or more memory devices are configured to operate in conjunction with one or more processors of the lottery ticket pack verification system 100.

For example, the one or more memory devices are configured to store software related information executed by the one or more processors. The one or more memory devices can also be configured to store additional data such as but not limited to: (1) operating data; (2) lottery ticket pack list data; (3) lottery ticket pack identification data; (4) lottery ticket pack verification data; (5) authentication data and/or validation data received from one or more operator input devices (e.g., combination display and input device 180); and (6) other such lottery ticket verification system data.

In the illustrated example, the controller 160 is configured to execute software enabling the various functions of the lottery ticket pack verification system 100. As such, the controller 160 is suitably communicatively connected to or configured to communicate with the first digital camera 140, the second digital camera 150, the combination display and input device 180, and other suitable components of the lottery ticket pack verification system 100 (such as other input devices).

In the illustrated example, the display mounting support 170 includes: (1) a display mounting support base 172 suitably connected to and supported by the frame 110; (2) a display mounting frame 174 connected to the mounting support base 172; and (3) a display mounting arm 176 connected to the display mounting frame 174.

In the illustrated example, the combination display and input device 180 includes: (1) a display housing 182; and (2) a display screen 184 suitably connected to and supported by the display housing 182. The display housing 182 is suitably connected to the display mounting arm 176 of the display mounting support 170. In the illustrated example, the combination display and input device 180 may thus include: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

In the illustrated example, the combination display and input device 180 also includes a built in touch-screen input device for the lottery ticket pack verification system 100. The combination display and input device 180 may include a touch-screen controller or other touch-sensitive display overlay to enable interaction with any image and/or image representation displayed by the combination display and input device 180. The touch-screen controller is configured to receive input data based on interaction with the displayed image and/or image representation. The touch-screen controller communicates received input data to the controller 160 for processing by the one or more processors. Input data received by the controller 160 can also be saved on the one or more memory devices. The touch-screen controller is further configured to receive output data generated by the controller 160. As such, the touch-screen controller may display received output data on the display screen 182 of the combination display and input device 180. It should be appreciated that the output and input devices may vary in accordance with the present disclosure.

In some examples, it will be understood that the combination display and input device 180 is configured to include a display device that is separate from the input device.

The operation of the lottery ticket pack verification system 100 is also partially shown in FIGS. 3 to 8. In the illustrated example embodiment, the lottery ticket pack verification system 100 is configured to simultaneously scan a plurality of lottery ticket packs 300 associated with a lottery ticket pack order. The plurality of lottery ticket packs 300 are placed face down on the lottery ticket pack scanning tray 200. In the illustrated example, the plurality of lottery ticket packs 300 are arranged in rows and/or columns for simultaneous scanning by the lottery ticket pack verification system 100. In one example, once the lottery ticket packs 300 are arranged, the lottery ticket pack scanning tray 200 is aligned on the lottery ticket pack verification system 100. In the illustrated example embodiment, the lottery ticket pack scanning tray 200 engages the tray aligner 126 such that the lottery ticket pack scanning tray 200 aligns with the alignment pattern 122 of the lottery ticket pack supporter 120. Alternatively, the lottery ticket packs 300 can be arranged directly on the surface of the lottery ticket pack supporter 120 and aligned with the lottery ticket pack verification system 100.

Once the lottery ticket pack scanning tray 200 is aligned, a lottery ticket picker uses the combination display and input device 180 to initiate a simultaneous scan of the plurality of lottery ticket packs 300 on the tray 200. In the illustrated example, the combination display and input device 180 displays a scan button 410 on the display screen 184. The lottery ticket picker touches or otherwise activates the scan button 410 causing the lottery ticket pack verification system 100 to simultaneously scan the plurality of lottery ticket packs 300.

In the illustrated example embodiment, the lottery ticket pack verification system 100 scan captures an image of the back surface of the bottom most ticket of each lottery ticket pack of the plurality of lottery ticket packs 300. The back surface of the bottom most ticket of each lottery ticket pack includes a plurality of lottery ticket information indicia 420 (similar to lottery ticket information indicia 16 and 26 of FIGS. 1B and 2B), such as but not limited to text, ticket numbers, barcodes and other ticket information visible on the back surface of the bottom most lottery ticket of each lottery ticket pack. The combination display and input device 180 displays an image or image representation 400 of the scanned plurality of lottery ticket packs 300. In the illustrated example, the image or image representation 400 comprises one or more images for each of the scanned lottery ticket packs 300. The image(s) for each of the scanned lottery ticket packs 300 includes the plurality of lottery ticket information indicia 420 on the back surface of the bottom most ticket of each scanned lottery ticket pack 300. Furthermore, the lottery ticket pack verification system 100, and particularly the controller in various embodiments determines the optimal or clearest lottery ticket information indicia 420 captured from the back surface of the bottom most ticket of each lottery ticket pack.

It should be appreciated that the controller may use any suitable method for making these determinations. For example, the controller may use a suitable comparison algorithm for comparing multiple captured image data sets for each of the lottery ticket packs, and determining which of the image data sets for that pack provides the most accurate image of the relevant data on the back surface of the bottom most ticket of that lottery ticket pack. The controller can independently thus do this for each pack. It should also be appreciated that in various embodiments the controller is configured to use the image data to determine separations or borders of the lottery ticket packs such that the controller can do a comparison on the correct data image sets for each respective lottery ticket pack. It should further be appreciated that due to the positions of cameras, the positions of the packs, the respective angles there between, and the lighting, (as well as possible other factors), that the different cameras can provide different image data sets for each of one or more of the lottery ticket packs that the controller can analyze to determine the best images for analysis and determinations of lottery ticket pack identification.

In various embodiments, the lottery ticket pack verification system 100 comprises a centralized user interface that interconnects the first and second digital cameras 140 and 150, via the controller 160, with the combination display and input device 180. Initiation of a scan, via activation of the scan button 410, causes simultaneous collection of scan or image data of the lottery ticket packs 300 by a plurality of cameras (e.g., the first and second cameras 140 and 150). In various embodiments, the scan or image data includes captured image data, read data (e.g., lottery ticket information indicia 420), product information and other such information on the back surface of the bottom most ticket of each scanned lottery ticket pack 300.

In various embodiments, the controller 160 then causes the combination display and input device 180 to display the collected scan data for each lottery ticket pack 300. In the illustrated example, the combination display and input device 180 displays the scan data in a plurality of virtual scanning zones on the display screen 184. Each virtual scanning zone is associated with one of the scanned lottery ticket packs 300 and/or an area where the pack resides or can reside. As such, the controller 160 causes the combination display and input device 180 to display the captured image data, read data and product information for each scanned lottery ticket pack 300 in the respective virtual scanning zone. Additionally, each virtual scanning zone will display a green area for a good scan/read, a yellow area for a warning associated with product validation of the scan/read, and red for an error in the scan/read. While the illustrated example shows the use of two digital cameras and sixteen virtual scanning zones, it will be understood that an alternative quantity of digital cameras and/or virtual scanning zones may be used.

In various embodiments, the controller 160 requests the last captured image data collected by the first and second digital cameras 140 and 150 and displays the captured image for each scanned lottery ticket pack 300 in the respective virtual scanning zone. The controller 160 then displays the product information associated with each scanned lottery ticket pack 300 in the respective virtual scanning zone. Furthermore, the controller 160 overlays the green area around each virtual scanning zone for a good scan, the yellow area for a good scan but there was an error resolving the product information, and the red area for a bad scan.

Figure 6:
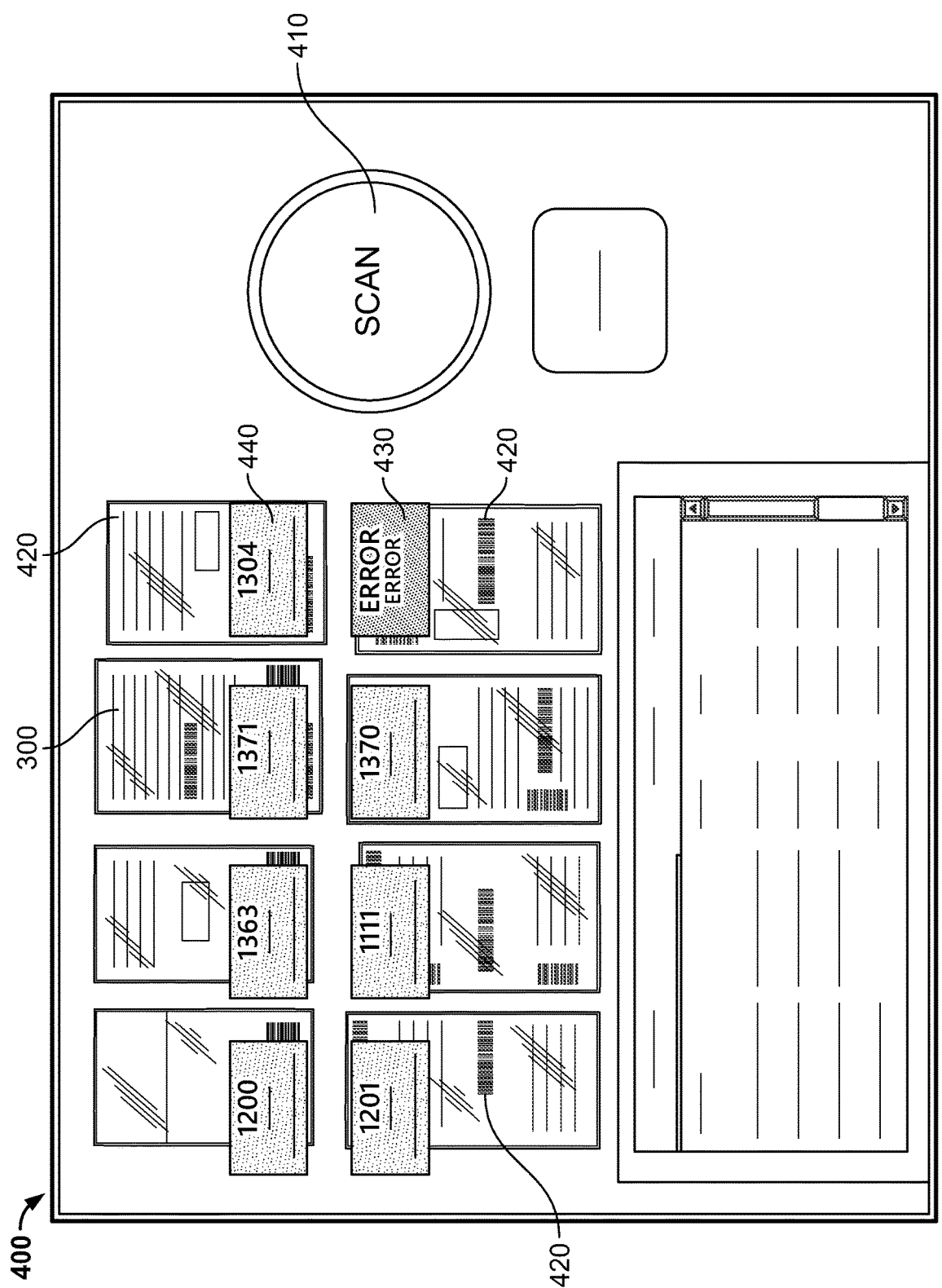
FIG. 6 is an enlarged example screen shot displayed by the combination display and input device of the lottery ticket pack verification system of FIG. 3, and showing an error notification displayed on the incorrect picked lottery ticket pack.

In the illustrated example, the lottery ticket pack verification system 100 analyzes and validates, via the controller 160, the scan data (e.g., captured image data, read data, and product information) of the bottom most ticket in each lottery ticket pack 300. The lottery pack verification system 100 determines if the captured read data (i.e., lottery ticket information indicia 420) for each lottery ticket pack matches lottery ticket packs 300 on the lottery ticket pack list. The controller 160 then updates the displayed virtual scanning zones with pass and/or fail notifications. In one example, if the lottery ticket pack verification system 100 determines that a scanned lottery ticket pack does not match any of the lottery ticket packs 300 on the lottery ticket pack list, the combination display and input device 180 displays an error notification 430. The controller 160 will attempt to rescan at least 3 times if a scanned lottery ticket pack does not match any of the lottery ticket packs 300 on the lottery ticket pack list. As best illustrated in FIG. 6, the combination display and input device 180 displays the error notification 430 on the image or image representation 400 of the scanned plurality of lottery ticket packs 300. The example error notification 430 indicates an incorrect selection of a lottery ticket pack. The error notification 430 may be displayed over a specific lottery ticket pack 300 to illustrate the position (e.g., row/column) of the incorrect lottery ticket pack on the lottery ticket pack scanning tray 200.

In some examples, the controller 160 of the lottery ticket pack verification system 100 analyzes the lottery ticket information indicia 420 to look up and validate game product information and whether the game is still active for each scanned lottery ticket pack 300. In one such example, the lottery ticket information indicia 420 comprises bar code data comprising a plurality of bar code values that are analyzed by the controller 160. The controller 160 may analyze a portion of the bar code values, such as the first four bar code values for validation of the game product. The controller 160 may execute a backend call for bar code value verification. The controller 160 may store all the verified and/or activated bar codes in the one or more memory devices. Furthermore, it will be understood that other portions of the lottery ticket information indicia 420 and or other quantities of bar code values may be used for validation of the lottery ticket packs 300.

In some examples, the controller 160 of the lottery ticket pack verification system 100 is configured to analyze the captured image taking into account that the wrapped lottery ticket packs are of different sizes and heights.

In some examples, the controller 160 of the lottery ticket pack verification system 100 is configured to analyze the captured image taking into account that the wrapped lottery ticket packs have different reflection characteristics associated with the reflection of light from the transparent pack wrapping used to wrap the lottery ticket packs.

Figure 7:
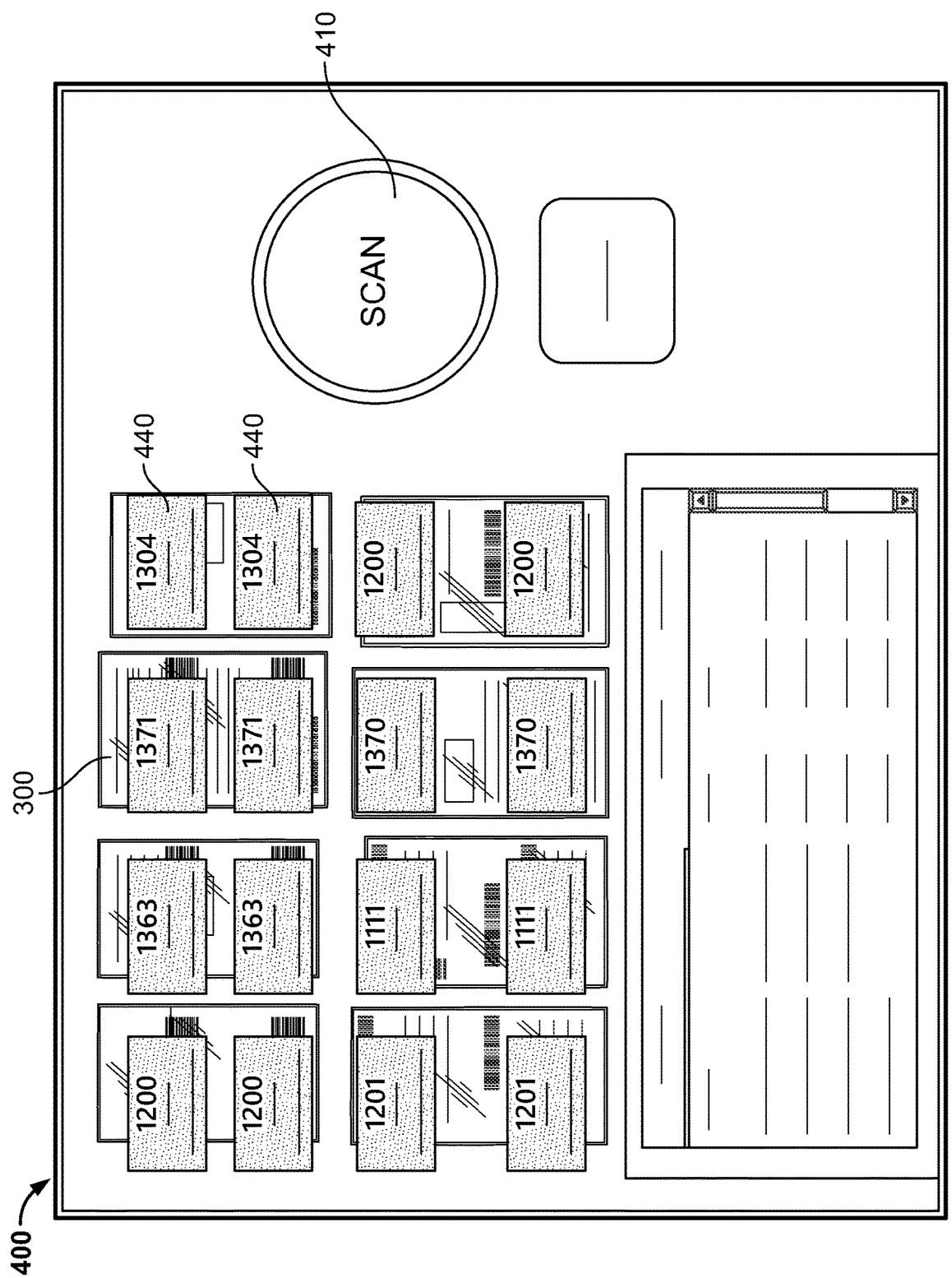
FIG. 7 is another enlarged example screen shot displayed by the combination display and input device of the lottery ticket pack verification system of FIG. 3, and showing the pass notification displayed on each of the correctly picked and scanned lottery ticket packs.

If the lottery ticket pack verification system 100 determines that all of the scanned lottery ticket packs 300 match the lottery ticket pack list, the combination display and input device 180 displays a pass notification 440 on the image or image representation 400 of the scanned plurality of lottery ticket packs 300. As best illustrated in FIG. 7, the combination display and input device 180 displays the example pass notification 440 on the image or image representation 400 of the scanned plurality of lottery ticket packs 300. The pass notification 440 indicates a correct selection of the lottery ticket packs 300 associated with the lottery ticket pack list.

Figure 8:
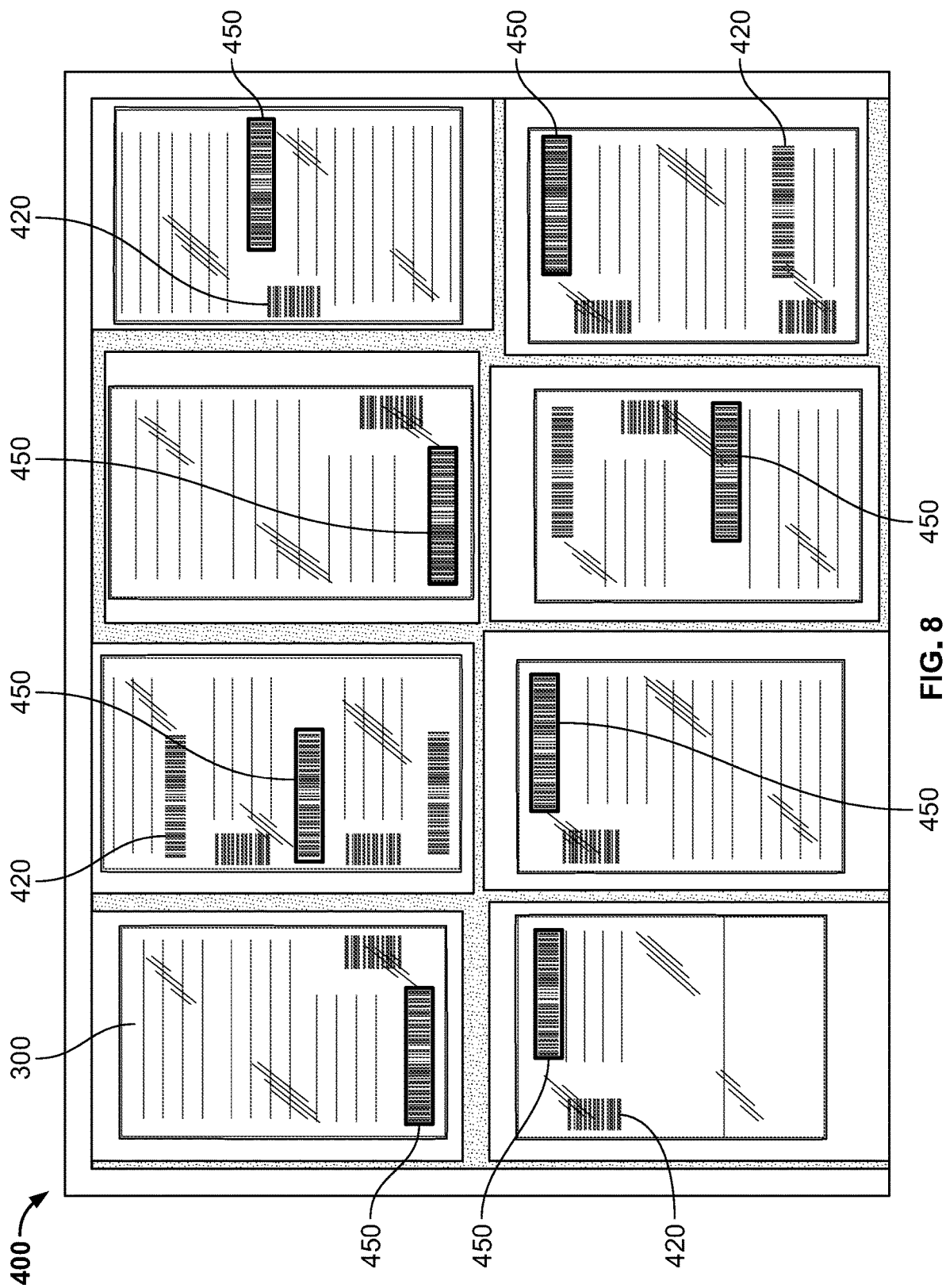
FIG. 8 is another example enlarged screen shot displayed by the combination display and input device of the lottery ticket pack verification system of FIG. 3, and showing the best determined lottery ticket information indicia for each scanned lottery ticket pack.

In the illustrated example embodiment, the lottery ticket pack verification system 100 analyzes the captured image of the bottom most ticket in each lottery ticket pack to determine the best lottery ticket information indicia 420 (e.g., text, ticket number, and ticket barcode) visible on the back surface of the bottom most lottery ticket of each lottery ticket pack for the above described verification process. For example, each lottery ticket pack 300 may have some lottery ticket information indicia 420 that is more (or less) visible than other lottery ticket information indicia 420. Visibility of the lottery ticket information indicia 420 may be affected by the arrangement of the lottery ticket packs 300 on the lottery ticket pack scanning tray 200, reflections of light from the transparent pack wrapping, and other visual interference caused by the transparent pack wrapping. As best shown in FIG. 8, in this example embodiment, the image or image representation 400 displayed on the combination display and input device 180 identifies a best determined lottery ticket information indicia 450 from the lottery ticket information indicia 420 visible on the back of the bottom most lottery ticket of each lottery ticket pack 300. The best determined lottery ticket information indicia 450 is generally the indicia best readable through the transparent pack wrapping of each lottery ticket pack. As such, the lottery ticket pack verification system 100 substantially guarantees the capture of at least one relevant lottery ticket information indicia 420 for each lottery ticket pack. It should be appreciated that the use of the multiple camera enables images of the packs from different angles and thus analysis of such different images.

In the illustrated example, the lottery pack verification system 100 uses the combination display and input device 180 to simultaneously display images and other data captured by the first and second digital cameras 140 and 150. As such, each of the first and second digital cameras 140 and 150 are configured to scan the plurality of lottery ticket packs 300 arranged and aligned on the lottery ticket pack supporter 120 or other such component of the lottery pack verification system 100. Following completion of the scan, the combination display and input device 180 displays a captured image for each lottery ticket pack from the arrangement of lottery ticket packs 300.

In the illustrated example, the controller 160 commands the first and second digital cameras 140 and 150 to simultaneously scan the plurality of lottery ticket packs 300 that fall within each camera field of view (FOV). For example, the FOV of the first digital camera 140 may be configured to capture eight lottery ticket packs 300. The FOV of the second digital camera 150 may be configured to scan eight different lottery ticket packs 300. Alternatively, in another example, the FOV of the first digital camera 140 may be configured to capture all sixteen lottery ticket packs 300, and the FOV of the second digital camera 150 may also be configured to scan all sixteen different lottery ticket packs 300. Thus, the simultaneous scan by the first and second digital camera 140 and 150 may simultaneously capture images for sixteen lottery ticket packs arranged and aligned on the lottery pack verification system 100. The controller 160 analyzes the lottery ticket information indicia 420 visible in each captured image (such as described above) to validate the lottery ticket product information (e.g., lottery game product name, active lottery game, and other such information) for each scanned lottery ticket pack 300.

The controller 160 then enables or otherwise instructs the combination display and input device 180 to display the sixteen captured images for the scanned lottery ticket packs 300. The controller 160 further displays the lottery ticket product information (e.g., lottery game product name, active lottery game, and other such information) for each scanned lottery ticket pack 300. In the illustrated example, the controller 160 displays a green area around each correctly scanned lottery ticket pack 300, a yellow area around each scanned lottery ticket pack 300 with an error in resolving the lottery ticket product information for that lottery ticket pack 300, and a red area around each incorrectly scanned lottery ticket pack 300.

Figure 9:
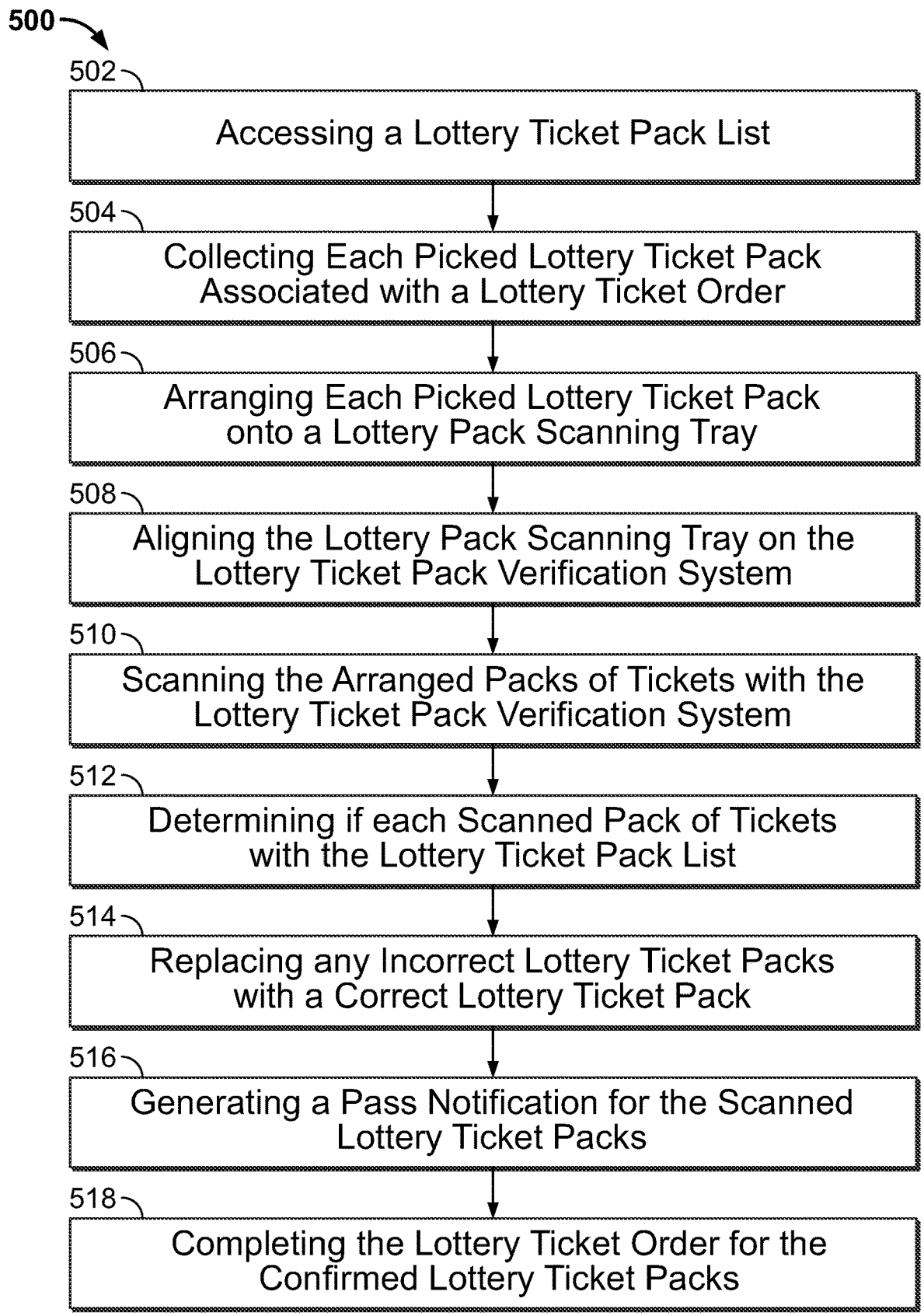
FIG. 9 is a flowchart illustrating one example method of operating the lottery ticket pack verification system of FIG. 3.

FIG. 9 is a flowchart of an example method indicated by numeral 500 of operating the lottery ticket pack verification system of the present disclosure. In one embodiment, the method is associated with the verification of a plurality of lottery ticket packs prior to shipment of a lottery ticket order. As such, the method includes a set of instructions stored in one or more memory devices and executed by one or more processors of the lottery ticket pack verification system. Although the method is described with reference to the flowchart shown in FIG. 9, many other processes of performing the acts associated with this illustrated example method may be employed. For example, the order of certain of the illustrated blocks may be changed, certain of the illustrated blocks may be optional, or certain of the illustrated blocks may not be employed.

Verification of lottery ticket packs associated with a specific lottery ticket order includes accessing a lottery ticket pack list, as indicated by block 502. The lottery ticket pack list generally includes a list of all the lottery ticket packs associated with a lottery ticket order for shipment to a lottery ticket retailer. In the illustrated example, a lottery ticket picker accesses a paper lottery ticket pack list or an electronic lottery ticket pack list. The paper lottery ticket pack list may be printed out or otherwise prepared for the lottery ticket picker. The electronic lottery ticket pack list may be accessed or viewed by the lottery ticket picker on a combination display and input device other such electronic display device.

After the lottery ticket picker accesses the lottery ticket pack list, the lottery ticket picker collects each lottery ticket pack included on the lottery ticket pack list, as indicated by block 504. The lottery ticket picker collects all of the lottery ticket packs on the lottery ticket pack list from a lottery ticket pack inventory area. The lottery ticket list includes lottery ticket information indicia (e.g., text, ticket numbers, ticket barcodes) associated with each lottery ticket pack on the lottery ticket pack list. The lottery ticket picker may refer to the lottery ticket information indicia during collection of each lottery ticket pack on the lottery ticket pack list.

Once the lottery ticket packs are collected, the lottery ticket picker arranges each lottery ticket pack for verification, as indicated in block 506. In some embodiments, each lottery ticket pack is arranged face down on a lottery ticket pack scanning tray such that the lottery ticket information indicia (e.g., text, ticket numbers, ticket barcodes) is visible on the back surface of the bottom most ticket of each lottery ticket pack.

Each lottery ticket pack is wrapped in a transparent pack wrapping. As a result, each lottery ticket pack is arranged such that the lottery ticket information indicia of the bottom most ticket of each lottery ticket pack is visible through the transparent pack wrapping. The lottery ticket picker arranges the lottery ticket packs into rows and/or columns on the lottery ticket pack supporter for simultaneous scanning and verification of each lottery ticket pack by the verification system. Ticket packs of different size, shape and/or height may be arranged on the lottery ticket pack scanning tray for simultaneous verification by the verification system.

As indicated in block 508, the lottery ticket packs may be arranged on the lottery ticket pack scanning tray and the lottery ticket picker aligns the lottery ticket pack scanning tray on the lottery ticket pack verification system. The lottery ticket pack scanning tray is configured to engage with a tray aligner such that the lottery ticket pack scanning tray aligns with the alignment pattern of a lottery ticket pack tray supporter. As a result, the plurality of lottery ticket packs are positioned within a field of view of first and second digital cameras of the lottery ticket pack verification system. It will be understood that verification of the lottery ticket packs can be done without the lottery ticket pack scanning tray. As such, the lottery ticket packs are arranged directly on the lottery ticket pack supporter and positioned within a field of view of the first and second digital cameras of the lottery ticket pack verification system.

The lottery ticket pack verification system simultaneously scans the plurality of lottery ticket packs arranged on the lottery ticket pack scanning tray, as indicated in block 510. In the illustrated example, the lottery ticket picker, or other such individual, provides an input to the lottery ticket pack verification system via a combination display and input device. The input triggers the lottery ticket pack verification system to simultaneously scan the lottery ticket packs arranged on the lottery ticket pack scanning tray. As a result, the lottery ticket verification system simultaneously scans all of the lottery ticket packs on the lottery ticket pack scanning tray.

The lottery ticket pack verification system then determines if each scanned lottery ticket pack matches the lottery ticket packs on the lottery ticket pack list, as indicated by block 512. If the lottery ticket pack verification system determines that a scanned lottery ticket pack does not match the lottery ticket pack list, the lottery ticket pack verification system generates an error notification to alert the lottery ticket picker of an incorrect lottery ticket pack.

The lottery ticket pack verification system displays any error notification on the combination display and input device. The combination display and input device may display the error notification to further illustrate a specific location (i.e., row/column) of the incorrect lottery ticket pack on the lottery ticket pack scanning tray. As a result, the lottery ticket picker can easily identify and locate the incorrect lottery ticket pack.

As indicated by block 514, if an incorrect lottery ticket pack is identified by the lottery ticket pack verification system, the lottery ticket picker replaces the incorrect lottery ticket pack with a correct lottery ticket pack. Once the incorrect lottery ticket pack is replaced, the lottery ticket pack verification system 100 scans (or rescans) the plurality of lottery ticket packs arranged on the lottery ticket pack scanning tray. As discussed above, the lottery ticket picker, or other such individual, provides an input to the lottery ticket pack verification system to simultaneously scan the lottery ticket packs on the lottery ticket pack scanning tray.

If the lottery ticket pack verification system determines that each scanned lottery ticket pack matches the lottery ticket pack list associated with the specific lottery ticket order, the lottery ticket pack verification system generates a pass notification for the scanned lottery ticket packs, as illustrated in block 516. The lottery ticket pack verification system 100 further updates the status for the scanned lottery ticket packs to verified lottery ticket packs. The lottery ticket pack verification system is configured to communicate the verified status of the lottery ticket packs with other systems associated with lottery ticket pack order fulfillment. For example, the verified status of the lottery ticket packs triggers the preparation and printing of shipping labels and other shipping documents associated with the verified lottery ticket packs.

Once the lottery ticket packs are verified, the lottery ticket order is completed, as indicated in block 518. The lottery ticket picker removes the lottery ticket pack scanning tray from the lottery ticket pack verification system and transports the verified lottery ticket packs to a packing area. The lottery ticket picker places the verified lottery ticket packs into a container (e.g., shipping box) for shipment of the lottery ticket packs to a retailer.

ALTERNATIVE EMBODIMENTS

Figure 10:
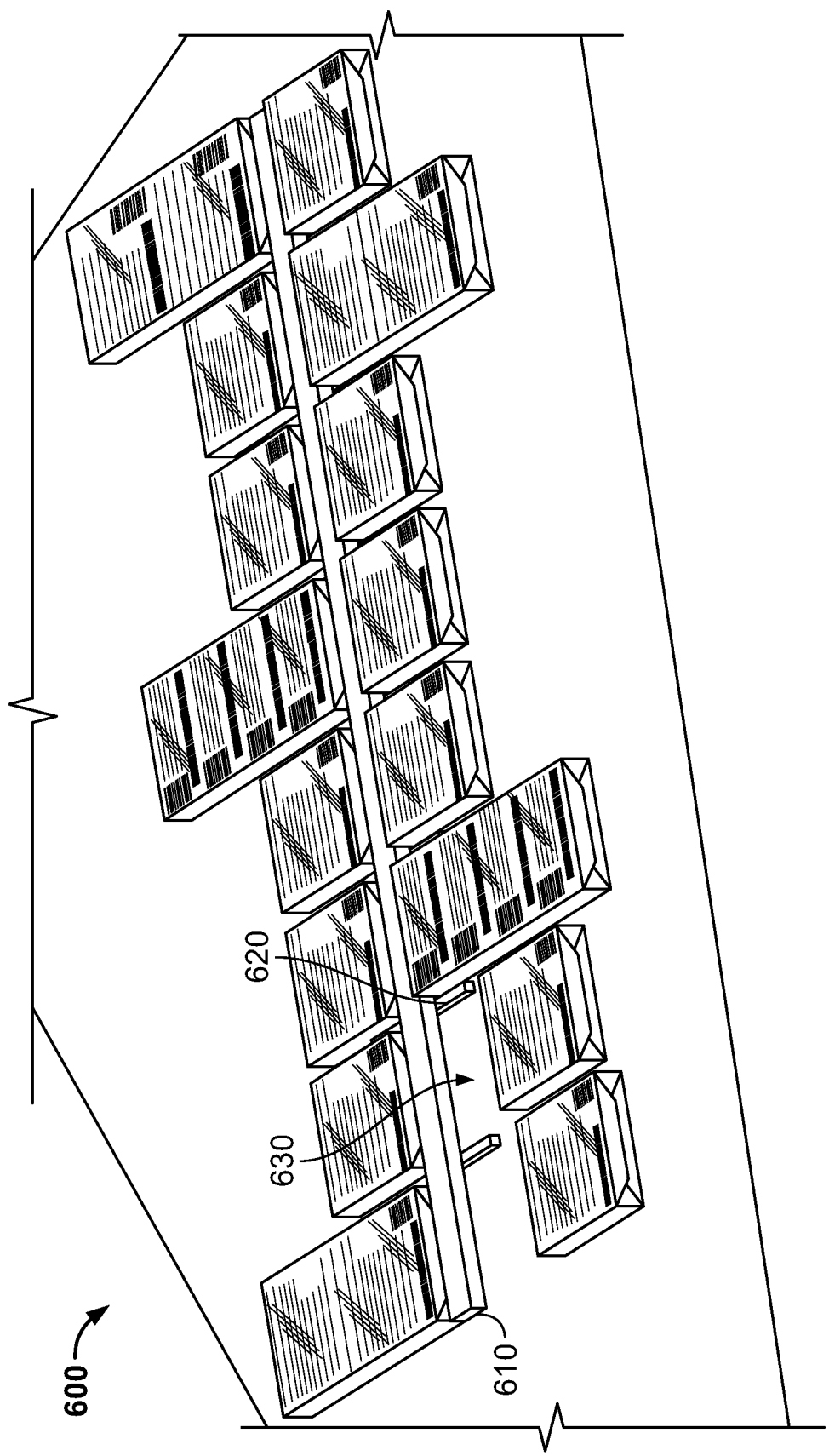
FIG. 10 is a perspective view of a pack aligner of an alternative embodiment of the lottery ticket pack verification system of FIG. 3, and showing a plurality of different picked lottery ticket packs positioned face down and aligned by the pack aligner on the lottery ticket pack verification system for scanning.

In an alternative embodiment, as shown in FIG. 10, the lottery pack verification system 100 may include a pack aligner 600 that is directly positioned and supported by the flat base 112 of the frame 110. The pack aligner 600 includes: (1) a longitudinal extending member 610; and (2) a plurality of transverse extending members 620. These members define a plurality of alignment zones 630. In the illustrated example, the pack aligner 600 may be positioned directly on the flat base 112 of the frame 110. Alternatively, the pack aligner 600 may be positioned and aligned on the lottery ticket pack supporter 120.

FIG. 10 thus illustrates one example of the pack aligner 600 configured to align and position a plurality of lottery ticket packs 300 for simultaneous verification by the lottery ticket pack verification system 100. In the illustrated example, the plurality of lottery ticket packs 300 are placed face down on the flat base 112 of the frame 110 or other such supporting surface. Each of the plurality of lottery ticket packs 300 are aligned in one of the plurality of alignment zones 630 defined by the longitudinal extending member 610 and the plurality of transverse extending members 620 of the alignment pattern 600. In this illustrated example, the plurality of lottery ticket packs 300 include packs of lottery tickets with different lengths, widths, and/or heights. For example, the pack aligner 600 may align different lottery ticket packs 300 with different sized tickets and different quantities of tickets in two or more of the stacks. Thus, the different lottery ticket packs 300 have different pack dimensions (e.g., one lottery ticket pack may have a different shape, size, and/or height compared to another lottery ticket pack).

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket pack verification system comprising:
a first digital camera;
a second digital camera; and
a controller configured to operate with the first digital camera and the second digital camera to:
cause the first digital camera to capture a first digital image of a plurality of wrapped lottery ticket packs on a lottery ticket pack supporter,
cause the second digital camera to capture a second digital image of the plurality of wrapped lottery ticket packs on the lottery ticket pack supporter,
based on at least one of the first digital image and the second digital image, determine if the plurality of wrapped lottery ticket packs match a lottery ticket pack list,
responsive to determining that any one of the plurality of wrapped lottery ticket packs does not match the lottery ticket pack list, cause a display, via a display device, of an indication of an error notification, and
responsive to determining that all of the plurality of wrapped lottery ticket packs match the lottery ticket pack list, cause a display, via the display device, of an indication of a pass notification.

2. The lottery ticket pack verification system of claim 1, wherein the controller is configured to analyze at least one of the first digital image and the second digital image to determine if the plurality of wrapped lottery ticket packs match the lottery ticket pack list.

3. The lottery ticket pack verification system of claim 1, wherein at least one of the first digital image and the second digital image comprise a plurality of lottery ticket information indicia visible on back surfaces of bottom most tickets of the plurality of wrapped lottery ticket packs.

4. The lottery ticket pack verification system of claim 1, which includes the display device, and wherein the controller is configured to cause the display device to display, based on at least one of the first digital image and the second digital image, a representation based on the plurality of wrapped lottery ticket packs.

5. The lottery ticket pack verification system of claim 4, wherein the controller is configured to cause the display device to display one of the indication of the error notification and the indication of the pass notification in association with the representation.

6. The lottery ticket pack verification system of claim 4, wherein the controller is configured to cause one of the indication of the error notification and the indication of the pass notification in association with the plurality of wrapped lottery ticket packs.

7. The lottery ticket pack verification system of claim 1, wherein the controller is configured to, for each of the plurality of wrapped lottery ticket packs, cause one of an individual error notification and an individual pass notification in association with that wrapped lottery ticket pack.

8. The lottery ticket pack verification system of claim 1, wherein the controller is configured to analyze at least one of the first digital image and the second digital image taking into account that the plurality of wrapped lottery ticket packs are of different sizes and heights.

9. The lottery ticket pack verification system of claim 1, wherein the controller is configured to analyze at least one of the first digital image and the second digital image taking into account that the plurality of wrapped lottery ticket packs have different reflection characteristics.

10. A lottery ticket pack verification system comprising:
a lottery ticket pack supporter;
a digital camera; and
a controller configured to operate with the digital camera to:
cause the digital camera to capture a digital image of a plurality of wrapped lottery ticket packs supported by the lottery ticket pack supporter, the digital image comprising a plurality of lottery ticket information indicia visible on one of surfaces of one ticket of each of the plurality of wrapped lottery ticket packs supported by the lottery ticket pack supporter,
analyze the digital image to determine if the plurality of wrapped lottery ticket packs match a lottery ticket pack list,
responsive to determining that any one of the plurality of wrapped lottery ticket packs supported by the lottery ticket pack supporter does not match the lottery ticket pack list, cause a display of an indication of an error notification, and
responsive to determining that all of the plurality of wrapped lottery ticket packs supported by the lottery ticket pack supporter match the lottery ticket pack list, cause a display of an indication of a pass notification.

11. The lottery ticket pack verification system of claim 10, which includes an input device, and wherein the controller is configured to receive, via the input device, an input to initiate the capture of the digital image by the digital camera.

12. The lottery ticket pack verification system of claim 10, wherein the digital image comprises a plurality of lottery ticket information indicia visible on back surfaces of bottom most tickets of each of the plurality of wrapped lottery ticket packs.

13. The lottery ticket pack verification system of claim 10, which includes a display device, and wherein the controller is configured to cause a display, by the display device, of a representation of the plurality of wrapped lottery ticket packs.

14. The lottery ticket pack verification system of claim 13, wherein the controller is configured to cause a display, by the display device, of one of the indication of the error notification and the indication of the pass notification in association with the representation.

15. The lottery ticket pack verification system of claim 10, wherein the controller is configured to cause one of the indication of the error notification and the indication of the pass notification in association with the plurality of wrapped lottery ticket packs.

16. The lottery ticket pack verification system of claim 10, wherein the controller is configured to, for each of the plurality of wrapped lottery ticket packs, cause one of an individual error notification and an individual pass notification in association with that wrapped lottery ticket pack.

17. The lottery ticket pack verification system of claim 10, wherein the controller is configured to analyze the digital image taking into account that the plurality of wrapped lottery ticket packs are of different sizes and heights.

18. The lottery ticket pack verification system of claim 10, wherein the controller is configured to analyze the digital image taking into account that the plurality of wrapped lottery ticket packs have different reflection characteristics.

19. A method of operating a lottery ticket pack verification system, comprising:
causing a digital camera to capture a digital image of a plurality of wrapped lottery ticket packs supported by a lottery ticket pack supporter, the digital image comprising a plurality of lottery ticket information indicia visible on surfaces of tickets of the plurality of wrapped lottery ticket packs supported by the lottery ticket pack supporter;

analyzing, via a controller, the digital image to determine if the plurality of wrapped lottery ticket packs match a lottery ticket pack list;

responsive to the controller determining that any one of the plurality of wrapped lottery ticket packs supported by the lottery ticket pack supporter does not match the lottery ticket pack list, causing a display of an indication of an error notification; and responsive to controller determining that all of the plurality of wrapped lottery ticket packs supported by the lottery ticket pack supporter match the lottery ticket pack list, causing a display of an indication of a pass notification.

20. The method of claim 19, which includes the controller causing a display device to display a representation of the plurality of wrapped lottery ticket packs, and one of the indication of the error notification and the indication of the pass notification in association with the representation of the plurality of wrapped lottery ticket packs.

\* \* \* \* \*